May 25, 1948.　　　　M. D. LISTON　　　　2,442,300

DIRECT CURRENT SERVO SYSTEM

Filed May 18, 1946

Inventor
Max D. Liston
By Attorneys
Blackmor, Spencer & Hunt

Patented May 25, 1948

2,442,300

UNITED STATES PATENT OFFICE 2,442,300

DIRECT CURRENT SERVO SYSTEM

Max D. Liston, Detroit, Mich., assignor to General Motors Corporation, Detroit, Mich., a corporation of Delaware Application May 18, 1946, Serial No. 670,673

4 Claims. (Cl. 318—28)

The present invention relates to a means for indication or recording a fluctuating minute potential such as the output of a heat responsive device and also to controlling a circuit or mechanical device responsive to this output. More specifically it relates to a D. C. follow-up device using a breaker type D. C. amplifier with a motor follow-up to drive a null device, said follow-up being by-passed by an adjustable resistance response controlling circuit.

In designing a follow-up system responsive to small, rapidly fluctuating D. C. potentials, two major problems are involved. One of these problems is obtaining amplification of the D. C. voltage to secure sufficient energy to actuate the follow-up device and the other is to eliminate the hunting of the follow-up device caused by time delay in a circuit and inertia in the mechanical elements of the follow-up.

The first of these problems, that of obtaining D. C. amplification, is solved in the amplifier shown in application Serial No. 442,572, Sargeant and Hooper, filed May 11, 1942, now Patent Number 2,413,788, patented January 7, 1947, and assigned to the present assignee.

The second problem, that of obtaining a sufficiently rigid follow-up or servo mechanism to eliminate hunting, is solved in the present application.

It is an object of the present invention to make a null type follow-up mechanism for a D. C. potential.

It is another object of the present invention to make a follow-up system that is simple to construct, reliable in operation, and very accurate.

It is a still further object of the present invention to make a follow-up device for a heat responsive element which may be utilized for indicating, measuring, recording or controlling.

It is a still further object of the present invention to make a follow-up device having an adjustable resiliency of follow-up to prevent hunting, and permit fidelity of response.

It is a still further object of the present invention to make a voltage measuring system for small magnitude D. C. potentials using a breaker type amplifier similar to that shown in application Serial No. 442,572 filed May 11, 1942, followed by a filter for removing voltage fluctuations and a means for minimizing the effect of the time delay caused by this filter, on the follow-up mechanism.

Other objects of the present invention will become apparent on reading the specification and inspection of the drawings and will be specifically pointed out in the claims.

Figure 1:
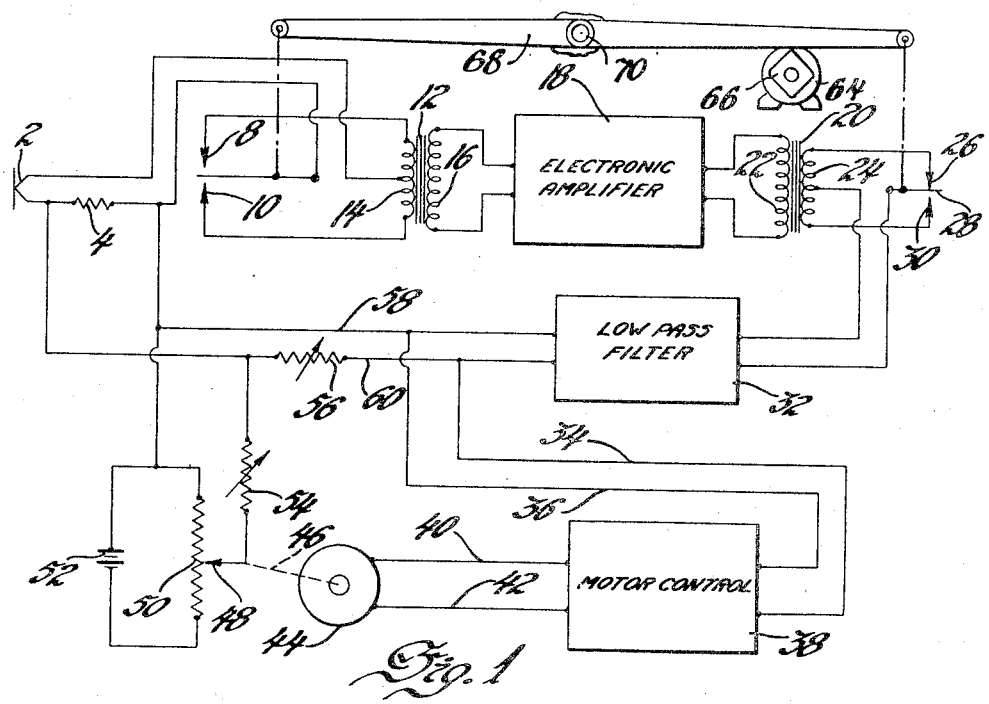
Figure 1 shows a schematic diagram of the preferred embodiment of my invention.

Referring more particularly to the drawings, in Figure 1, 2 is a heat responsive device such as a thermopile, 4 is a resistance or impedance across which a second voltage may be inserted into the input circuit. 6 is a vibrating contact alternately making circuit with contacts 8 and 10. 12 is a transformer having a center tapped primary 14 and a secondary 16. 18 is an electronic amplifier. 20 is an output transformer from the amplifier having a primary 22 and a center tapped secondary 24. 28 is a contact synchronously driven with contact 6 and alternately making circuit with contacts 26 and 30. For illustration purposes this synchronous drive is shown as including a lever 68 pivoted at 70 and operated by a cam 66 driven by electrical motor 64. 32 is a low pass filter capable of filtering out alternating current components of very low frequency. 38 is a motor control device which may be a thyratron control, a voltage responsive switch, or any of the common means of controlling an electric motor responsive to voltage fluctuations. 34 and 36 are conductors connected to the output of the low pass voltage 32 for energizing this motor control circuit 38. The output of this motor control circuit by means of conductors 40 and 42 energize the reversible motor 44. This motor is mechanically attached to a potentiometer arm 48 by means of a shaft 46. 52 is a battery or other D. C. source for energizing the circuit including the variable resistor 50. 54 is a voltage divider resistor cooperating with resistor 4 to determine the portion of the output of variable resistor 50, that is to be introduced into the input circuit of the device. This output, which is introduced across resistor 4, is of opposite polarity to that generated by the heat responsive device 2. 58 and 60 are conductors for introducing the voltage or output of the low pass filter 32 into the input circuit. Resistor 56 which is preferably, but not necessarily, adjustable, cooperates with resistor 4 as a voltage divider to determine the portion of the output of the low pass filter 32 to be introduced across resistor 4. This voltage is of opposite polarity to that generated by the heat responsive device 2. Variable resistor 56 determines the proportion of the filter output voltage to be introduced into the input circuit and thereby controls the response time of the motor 44 and the rigidity of the system.

The circuit including variable resistor 56 has no current flowing through it when the system has reached a null and is in balance. When the system is balanced the output from the variable resistor 50, that is introduced across resistor 4, just balances out the potential generated by the voltage producing device 2 (here shown as a thermopile).

Figures 2, 3, 4, 5:
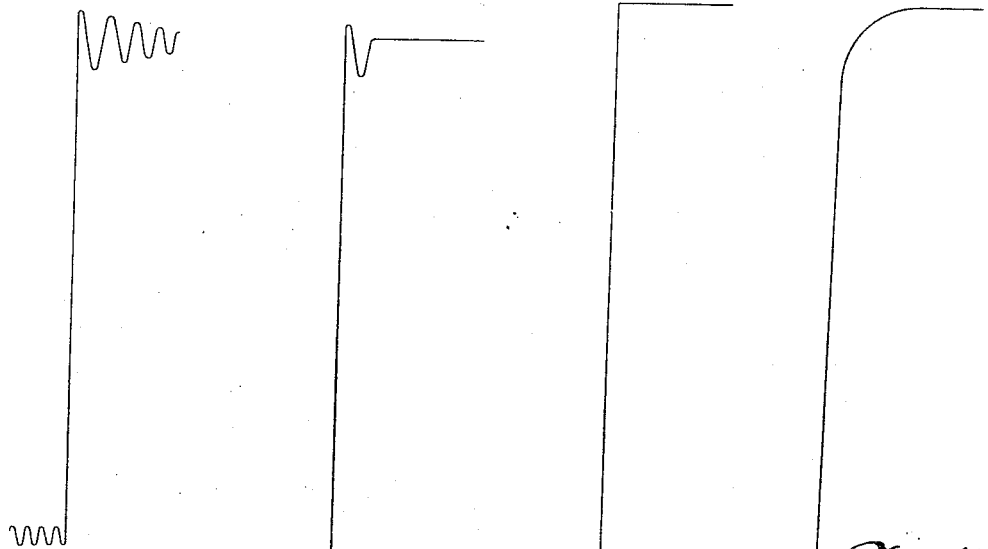
Figures 2, 3, 4 and 5 are response curves showing the effect of varying resistance 56.

Figures 2, 3, 4 and 5 are response curves obtained from the follow-up using a square wave input at the element 2. Figure 2 shows the type of response curve obtained with the resistance of 56 equal to infinity, or an open circuit at 56. The follow-up system under such conditions is subject to violent hunting action. The hunting action is considerably damped by the introduction of a large resistance at 56. A response curve similar to Figure 3 results from the introduction of such a resistance.

Figure 4 shows the high fidelity response curve free from hunting, that is obtained by introducing the optimum resistance at element 56.

Figure 5 is a response curve obtained with resistance 56 of insufficient magnitude. The potential introduced into the amplifier is thereby reduced below that necessary for best performance of the apparatus by too great a voltage being introduced across resistor 4.

The operation of this device is as follows:

The heat responsive element 2 may be heated by any heat producing device. In one specific application it is heated by the output of a spectrograph. This voltage is fed through resistance 4 and is chopped into an alternating voltage by the contacts 6, 8 and 10. This voltage is transformed through transformer 12 and introduced into the A. C. electronic amplifier 18. The amplified signal is then fed through transformer 20 and rectified by contacts 28, 26 and 30 which are synchronously driven with the chopper contacts 6, 8 and 10. The output from this rectifier is of a pulsating nature and contains A. C. components. The filter 32 removes these A. C. components. The output of this filter is then fed in parallel circuits, one of these circuits including conductors 34 and 36 to the motor control 38. This motor control energizes the motor 44 to drive the variable resistor arm 48. It may also drive through shaft 46 any of the well-known recording or indicating devices or may be used to actuate any of the well-known control circuits such as burner controls on furnaces. The battery 52 determines the total voltage drop across the resistor 50. The contact 48 is driven along this resistor until the voltage across the resistor 4 is exactly equal to that generated by the heat responsive device 2. At that time there is no input into the electronic amplifier and therefore no output to the motor control device nor to the conductors 58 and 60. To minimize over-controlling with the consequent hunting of the device caused by time delay in the circuit due to delay in electrical response or due to mechanical inertia, the parallel circuit including resistor 56 and conductors 58 and 60 is used. This parallel circuit by-passes the motor follow-up mechanism and feeds back into input circuit by means of resistor 4, a portion of the output from the low pass filter. It therefore acts as an anticipating device, that is, the larger the signal output from the filter, the greater the voltage introduced across resistor 4 to oppose that generated by heat responsive device 2. When the circuit is balanced, this signal reduces to zero and consequently produces no voltage across the resistor 4. In this way the drive from the motor may be controlled in such a manner as to obtain a follow-up of a rapidly changing D. C. potential that is extremely accurate, without overdriving the null point in the input circuit thereby causing hunting. The amount of signal being thus fed in parallel to the motor circuit may be controlled by adjusting resistor 56. Therefore, if a rapidly fluctuating heat source such as that encountered by spectrographic analysis is being measured, the resistor 56 may be adjusted to obtain the optimum follow-up characteristics and prevent overshooting and hunting.

It is to be understood also that although the invention has been described with specific reference to a particular embodiment thereof, that of a temperature measuring device, it is not to be so limited, since changes and alterations therein may be made within the full intended scope of this invention as defined by the appended claims.

I claim:

1. An electronic system including, an input circuit having a source of D. C. voltage, a periodically operated interrupter converting said D. C. voltage into A. C. voltage, an amplifier for amplifying said A. C. voltage, a second interrupter driven in synchronism with said first interrupter for converting said A. C. voltage into a pulsating D. C. voltage, a filter for removing A. C. components from said D. C. voltage, a response controlling circuit for introducing a predetermined adjustable amount of said filtered D. C. voltage into said input circuit in series with and in opposing polarity to said first mentioned source of D. C. voltage, a separate circuit in parallel with said response controlling circuit for introducing a D. C. voltage into said input circuit in aiding polarity with said response controlling voltage, said circuit including a source of D. C. voltage, a motor driven means for adjusting the amount of D. C. voltage introduced into said input circuit, a means for controlling said motor responsive to said filter output so that the voltage in said input circuit is balanced.

2. An electronic system including, an input circuit having a source of D. C. voltage, a mechanical periodically operated interrupter converting said D. C. voltage into A. C. voltage, an amplifier amplifying said A. C. voltage, a second interrupter driven in synchronism with said first interrupter for converting the amplified A. C. voltage into D. C. voltage, a response controlling circuit for introducing a part of said last mentioned D. C. voltage into said input circuit in opposing polarity to said first mentioned D. C. voltage, a motor driven follow-up means responsive to said amplifier output for controlling a second D. C. voltage source, means for introducing a voltage from said second D. C. source into said input circuit to balance the other voltages in said circuit.

3. A follow-up system including, a source of D. C. potential, a second source of D. C. potential, a motor driven adjustment for said second source of potential responsive to said first source of potential, circuit connections between said first source of potential and the adjustable output of said second source of potential to combine said potentials in opposing polarity and thus cancel out said first source of potential, means for introducing a response controlling voltage in parallel with said second source of potential effective during changes in output of the first source of D. C. potential in opposition to said first source of potential and proportional to the algebraic sum of the potentials introduced into the input circuit by said two sources of potential.

4. A servo system including, a source of D. C. potential, an amplifier for D. C. potential, an impedance connected in series with said source and the input to said amplifier, the output of said amplifier connected in series with said impedance and a second impedance, an electrical motor connected to an adjustable source of D. C. potential, said adjustable source of D. C. potential so connected to said first mentioned impedance as to introduce a current in said first mentioned impedance opposite in phase to the current introduced by said first mentioned source of potential, said electric motor so connected to and controlled by the output of said amplifier as to cause the adjustment of said adjustable source of D. C. potential as to place said servo system in equilibrium.

MAX D. LISTON.

REFERENCES CITED

The following references are of record in the file of this patent:

UNITED STATES PATENTS

| Number | Name | Date |
| --- | --- | --- |
| 2,025,749 | Hubbard | Dec. 31, 1935 |
| 2,109,222 | Ryder | Feb. 22, 1938 |
| 2,113,436 | Williams | Apr. 5, 1938 |
| 2,203,689 | MacDonald | June 11, 1940 |
| 2,376,599 | Jones | May 22, 1945 |